Dec. 9, 1930. P. W. DES ROCHES 1,783,959
CONTROL MEMBER FOR LIQUIDS
Filed Sept. 9, 1927
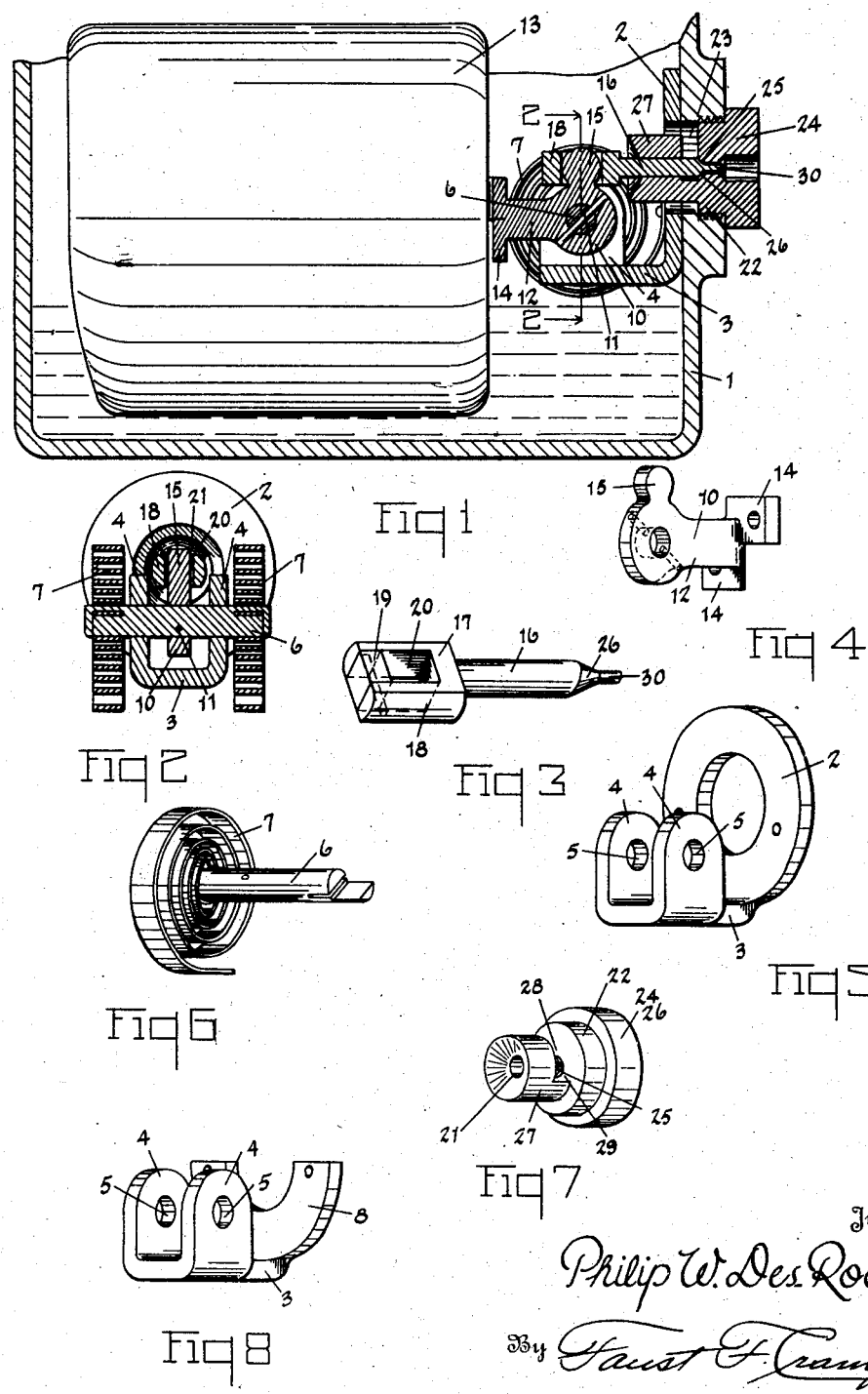
Inventor
Philip W. Des Roches.
By Faust F. Crampton
Attorney Patented Dec. 9, 1930.

1,783,959

UNITED STATES PATENT OFFICE

PHILIP W. DES ROCHES, OF DETROIT, MICHIGAN

CONTROL MEMBER FOR LIQUIDS

Application filed September 9, 1927. Serial No. 218,397.

My invention has for its object to provide a novel and efficient construction for controlling the operation of valves according to the level of liquids. The invention particularly provides a means whereby the operation of any type of valve used for controlling the movement of any liquid according to the level of the liquid that will assure positive action of the valve between closely positioned limits of operation or small differences in level. The invention provides a solid control member and preferably one that is heavier than the liquid. The control member is counterbalanced to a certain degree by the torque of a bent or deformed spring.

It has been found that hollow floats, which are made from two pieces of thin material, become leaky after continued use and, when used for controlling liquid, become irregular in their control. The leakage of the liquid into the interior of the float destroys the functioning of the valve structure. The valve mechanism may be used with liquids which vary in specific gravity and has means of adjusting the counterbalancing springs which will increase or decrease the torque relative to the weight of the controlling member in the liquid. Also, by using a heavy control member, it will have considerable inertia and will not be affected by the agitation of the liquid and, in case of shipment, the member may be counterbalanced by a suitable yielding member to prevent injury to the valve mechanism. By counterbalancing the member nearly all of the fluid displacement is effectually used for controlling the valve whereby the displacement member may be made small in size; such a displacement member is independent of external pressure. Also, when the container of the liquid and displacement is turned on its side, the counterbalancing member will operate to close the valve.

The invention may be embodied in structures that vary in their details and are used for different purposes. To illustrate a practical application of my invention, I have selected a valve assembly as an example of my invention and shall describe it hereinafter. The valve assembly selected as an example is shown in the accompanying drawings.

Fig. 1 is a side elevation of the valve assembly, the valve parts being shown in section. Fig. 2 is a view of a section taken on the plane of the line 2—2 in Fig. 1. Fig. 3 is an enlarged perspective view of the needle valve. Fig. 4 is a perspective view of the cam lever link. Fig. 5 is a perspective view of the mounting plate. Fig. 6 is a perspective view of the supporting shaft, one spring being connected thereto. Fig. 7 is a view, in perspective, of the needle valve supporting member. Fig. 8 is a perspective view of a modified form of mounting plate.

The particular form of construction which has been selected as an embodiment of my invention has a valve that controls the inflow of a liquid according to the level of the liquid in the container and is particularly adapted for use in connection with liquids, volatile at ordinary temperatures and condensible at slight changes of temperature, and liquids variable in specific gravity due to variable mixtures with other liquids. In the form of construction shown in the drawings, the valve assembly is secured to the inner wall of any suitable container 1 wherein the valve is to be used. The mounting plate 2 may be secured by any suitable manner such as bolting or by welding. The mounting plate 2 has an outwardly extending flange portion 3. A pair of ears 4 extend at right angles from the flange 3 and may be provided with holes 5 for supporting a shaft 6. The ends of the cylindrical shaft 6 are slotted to receive the inner ends of the springs 7. The outer ends of the springs may be secured to the mounting plate 2. The shaft 6 also supports a cam lever 10 which is pinned to the shaft by the pin 11. The projecting arm portion 12 of the lever 10 is riveted or secured by screws to a controlling member 13, the attachment being made to the flanges 14 extending at right angles from the body portion of the lever 10. The member 13 is preferably solid and consequently enables the use of a small controlling member, the volume of the member being only that required to produce movement of the valve. The springs 7 are so displaced as to give an initial tension sufficient to counterbalance the torque produced by the weight of the displacement member. The counterbalancing action of the springs may be varied by removing the pin 11 and rotating the shaft 6 until the desired amount of torque has been made in the springs. Preferably, the springs are so formed as to afford substantially a constant resistance to the deflection produced by the slight changes in elevation or angular movement of the displacement member required to operate the valve. The pin 11 then locates the lever 10 for its usual rotative movement as determined by the location of the controlling member 13, or the number of turns on the springs 7 may be varied.

In order to use this particular form of construction for controlling needle valves, the lever 10 may be provided with a circular-shaped head 15. The shaft 16 of the needle valve 17 has an enlarged end portion 18 which may be slotted and closed by a block 19 as shown in Fig. 3 or may be milled to form the opening 20 so that, as the head 15 of the lever 10 is rotated about the axis of the shaft 6, the head 15 will engage the end of the opening 20 to move the needle valve shaft 16 backward or forward to open or close the valve. The shaft 16 is movably supported in the hole 21 formed in a bushing 22. The bushing 22 is located in the hole 23 in the wall of the container 1. An enlarged portion 24 of the bushing abuts the face of the wall of the container and retains the bushing from further inward movement. The hole 21 in which the needle valve 17 is located is reduced as at 25 to form a valve seat for the tapered end 26 of the needle valve shaft 16.

To provide sufficient passage for liquid between the bushing 22 and the wall of the hole 23 of the container, the end 27 of the bushing 22 is reduced in diameter and formed cylindrical in shape and a slotted opening 28 is made in the side of the cylinder at the point at which the diameter is increased to the diameter of the bushing 22. The slot 28 continues the surface 29 made by the reduced diameter of the portion 27 below the horizontal axis of the bushing 22. As the controlling member 13 is lowered by the decreased amount of liquid in the container 1, the lever 10 rotates on the axis of the shaft 6 which causes the head 15 to draw the shaft 16 outwardly with respect to the bushing 22. This causes the tapered portion 26 to be drawn from engagement with the valve seat 25 which allows additional liquid to flow through the hole 21 in the bushing 22.

In order to provide a means for keeping the valve seat clear from obstruction, the tapered portion 26 of the shaft 16 is continued in the form of a small elongated nipple or needle. The nipple 30 forces an opening or breaks up any clogged mass of sediment that deposits in the opening 21.

In Fig. 8, a mounting plate is illustrated having only half the surface area as the mounting plate shown in Fig. 5. To reduce the cost of production, the plate 8 may be made from a piece of stock slightly shorter than required for the first described mounting plate 2, shown in Fig. 5.

I claim:

1. In a liquid control device, a container having a port for admitting the liquid to the container, a member pivotally supported in the container and tending to move by gravity in one direction a spiral spring for counterbalancing a portion of the weight of the member and surrounding the pivotal axis of the member, a valve member connected to the member and adapted to be moved thereby to close and open the port.

2. In a liquid control device, a container for containing liquid, a bushing having a reduced cylindrical portion protruding into the container, said cylindrical portion spaced from the wall of the opening surrounding the bushing, the bushing having an opening therethrough, a slot extending into the side of the cylindrical portion, a valve seat formed in one side of the slot and at the end of the opening extending through a part of the bushing, a valve located in the cylindrical portion and extending through the slot and located in position to be seated on the valve seat.

3. In a liquid control device, a container for containing liquid, a bushing having a reduced cylindrical portion protruding into the container and having an opening therethrough, a slot extending into the side of the cylindrical portion, said cylindrical portion spaced from the wall of the opening surrounding the bushing, a valve seat formed in one side of the slot and at the end of the opening extending through a part of the bushing, a valve located in the cylindrical portion and extending through the slot and located in position to be seated on the valve seat, and having a needle extending into the last mentioned opening to eject any foreign material that may lodge in the opening.

4. In a liquid control device, a container for containing a liquid, a bushing having a cylindrical portion protruding into the container, a slot extending into the side of the cylindrical portion, a valve seat formed in one side of the slot and at the end of the opening extending through a part of the bushing, a valve located in the cylindrical portion and extending through the slot and located in position to be seated on the valve seat, a member movably supported in the container and tending to move by gravity in one direction, and a spring for counterbalancing a portion of the weight of the member, means for connecting the member with the valve for moving the valve longitudinally with respect to the said bushing, the bushing having an opening extending therethrough.

5. In a liquid control device, a container for containing liquid, a bushing having a cylindrical portion protruding into the container, a slot extending into the side of the cylindrical portion, the bushing having an opening extending therethrough in communication with the said slot, a valve seat formed in one side of the slot and surrounding the opening, a valve located in the cylindrical portion and extending through the slot and located in a position to be fitted on the valve seat, a member pivotally supported in the container and tending to move by gravity in one direction, a convolute spring connected to the member and surrounding and connected to the pivotal axis of the member, means interconnecting the valve member with the last named member for slidably moving the valve member in the bushing.

6. In a liquid control device, a container for containing a liquid, the container having a port for the movement of the liquid therethrough, a pivoted member located in the container and having specific gravity greater than the specific gravity of the liquid, the pivotal center of the member being located in proximity to the end of the member, a valve operated by the member for closing and opening the port, a spring formed to maintain a substantially constant torque to the member about the pivot point for counterbalancing the weight of the member notwithstanding the slight change in the movement of the member required to open the valve.

In witness whereof I have hereunto signed my name to this specification.

PHILIP W. DES ROCHES.